(12) United States Patent
Baek et al.

(10) Patent No.: US 9,706,074 B2
(45) Date of Patent: Jul. 11, 2017

(54) METHOD AND APPARATUS FOR CAPTURING IMAGES IN AN ELECTRONIC DEVICE

(71) Applicant: Samsung Electronics Co., Ltd., Gyeonggi-do (KR)

(72) Inventors: Jaemyung Baek, Gyeonggi-do (KR); Dongyoul Park, Gyeonggi-do (KR); Soonkyoung Choi, Seoul (KR); Sabari Raju Shanmugam, Bangalore (IN); Minyoung Chang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 58 days.

(21) Appl. No.: 14/468,874

(22) Filed: Aug. 26, 2014

(65) Prior Publication Data
US 2015/0054985 A1    Feb. 26, 2015

(30) Foreign Application Priority Data

Aug. 26, 2013  (KR) .................. 10-2013-0101121

(51) Int. Cl.
| | |
|---|---|
| H04N 5/228 | (2006.01) |
| H04N 1/21 | (2006.01) |
| H04N 5/355 | (2011.01) |
| H04N 5/232 | (2006.01) |
| H04N 5/235 | (2006.01) |
| H04N 5/222 | (2006.01) |
| G06T 5/00 | (2006.01) |
| G06T 5/50 | (2006.01) |

(52) U.S. Cl.
CPC .......... *H04N 1/2129* (2013.01); *H04N 5/2355* (2013.01); *H04N 5/2356* (2013.01); *H04N 5/23293* (2013.01); *H04N 5/35536* (2013.01); *G06T 5/007* (2013.01); *G06T 5/50* (2013.01)

(58) Field of Classification Search
CPC ............... H04N 5/2355; H04N 5/2356; H04N 5/23293; H04N 5/35536; G06T 5/007; G06T 5/008; G06T 5/009
USPC ........................................ 348/222.1, 333.01
See application file for complete search history.

(56) References Cited

U.S. PATENT DOCUMENTS

| | | | |
|---|---|---|---|
| 5,828,793 A | 10/1998 | Mann | |
| 8,115,836 B2 * | 2/2012 | Miyahara | H04N 5/2355 348/254 |

(Continued)

*Primary Examiner* — Ngoc-Yen Vu
(74) *Attorney, Agent, or Firm* — Cha & Reiter, LLC (57) ABSTRACT

A method is provided including: capturing a first set of images, wherein each one of the first set of images is captured in accordance with a different value of a camera setting; generating a second set of reduced images, wherein each of the second set of reduced images is a reduced version of a respective one of the first set of images; generating, by an electronic device, a third set of composite images, wherein each one of the third set of composite images is generated by HDR-compositing the second set of reduced images in accordance with a different weight-ratio; receiving a selection of a first composite image, the first composite image being part of the third set of composite images; and storing a second composite image, the second composite image being generated by HDR-compositing the first set of images in accordance with a weight ratio associated with the first composite image.

14 Claims, 6 Drawing Sheets

(56) References Cited

U.S. PATENT DOCUMENTS

| | | | | |
|---|---|---|---|---|
| 8,135,235 B2* | 3/2012 | Kang | ................. | H04N 5/20 |
| | | | | 345/604 |
| 8,285,134 B2* | 10/2012 | Joo | ................. | H04N 5/235 |
| | | | | 348/663 |
| 8,515,206 B2* | 8/2013 | Choe | ................. | H04N 5/23232 |
| | | | | 348/584 |
| 8,866,928 B2* | 10/2014 | Geiss | ................. | H04N 5/335 |
| | | | | 348/222.1 |
| 8,896,625 B2* | 11/2014 | Chen | ................. | G06T 5/50 |
| | | | | 345/589 |
| 9,013,592 B2* | 4/2015 | Levoy | ................. | H04N 5/23212 |
| | | | | 348/222.1 |
| 9,113,086 B2* | 8/2015 | Kim | ................. | H04N 5/2351 |
| 9,390,482 B2* | 7/2016 | Lee | ................. | G06T 5/007 |
| 9,554,056 B2* | 1/2017 | Touze | ................. | H04N 5/2355 |
| 2005/0243176 A1* | 11/2005 | Wu | ................. | G06T 5/50 |
| | | | | 348/207.1 |
| 2012/0002069 A1* | 1/2012 | Takagi | ................. | H04N 5/2355 |
| | | | | 348/222.1 |
| 2013/0089262 A1* | 4/2013 | Chen | ................. | G06T 5/002 |
| | | | | 382/218 |
| 2014/0218552 A1* | 8/2014 | Huang | ................. | G11B 27/034 |
| | | | | 348/218.1 |
| 2014/0219582 A1* | 8/2014 | Huang | ................. | G11B 27/034 |
| | | | | 382/284 |
| 2014/0354845 A1* | 12/2014 | Molgaard | ................. | H04N 1/215 |
| | | | | 348/222.1 |
| 2016/0173751 A1* | 6/2016 | Nakata | ................. | H04N 5/2355 |
| | | | | 348/362 |

* cited by examiner

METHOD AND APPARATUS FOR CAPTURING IMAGES IN AN ELECTRONIC DEVICE

CLAIM OF PRIORITY

This application claims the benefit under 35 U.S.C. §119(a) of a Korean patent application filed on Aug. 26, 2013 in the Korean Intellectual Property Office and assigned Serial No. 10-2013-0101121, the entire disclosure of which is hereby incorporated by reference.

TECHNICAL FIELD

The present disclosure relates to image processing and, more particularly, to a method and apparatus for capturing images.

BACKGROUND

Digital cameras can exist in standalone form or they can be integrated into various other electronic devices, such as mobile phones, smart phones, tablet PCs (Personal Computers), desktop PCs, notebook PCs, and smart televisions. Digital cameras utilize image sensors (e.g. CMOS sensors) to convert optical images into electronic signals. However, many image sensors have a dynamic range that is lower than that of the human eye and this may cause captured images to be less vivid than otherwise. Accordingly, a need exists for new techniques that result in increased dynamic range of captured images.

SUMMARY

The present disclosure addresses this need. According to one aspect of the disclosure, a method is provided comprising: capturing a first set of images, wherein each one of the first set of images is captured in accordance with a different value of a camera setting; generating a second set of reduced images, wherein each of the second set of reduced images is a reduced version of a respective one of the first set of images; generating, by an electronic device, a third set of composite images, wherein each one of the third set of composite images is generated by HDR-compositing the second set of reduced images in accordance with a different weight-ratio; receiving a selection of a first composite image, the first composite image being part of the third set of composite images; and storing a second composite image, the second composite image being generated by HDR-compositing the first set of images in accordance with a weight ratio associated with the first composite image.

According to another aspect of the disclosure, an apparatus is provided comprising a camera module, a memory, and a control unit configured to: capture a first set of images, wherein each one of the first set of images is captured in accordance with a different value of a camera setting; generate a second set of reduced images, wherein each of the second set of reduced images is a reduced version of a respective one of the first set of images; generate, by an electronic device, a third set of composite images, wherein each one of the third set of composite images is generated by HDR-compositing the second set of reduced images in accordance with a different weight-ratio; receive a selection of a first composite image, the first composite image being part of the third set of composite images; and store a second composite image, the second composite image being generated by HDR-compositing the first set of images in accordance with a weight ratio associated with the first composite image.

BRIEF DESCRIPTION OF THE DRAWINGS

The above and other aspects, features, and advantages of certain embodiment of the present disclosure will be more apparent from the following description taken in conjunction with the accompanying drawings, in which.

DETAILED DESCRIPTION

Hereinafter, aspects of the disclosure are described in detail with reference to the accompanying drawings. The same reference symbols are used throughout the drawings to refer to the same or like parts. Detailed descriptions of well-known functions and structures incorporated herein may be omitted. For the same reasons, some components in the accompanying drawings may be emphasized, omitted, schematically illustrated, and/or not drawn to scale. Therefore, the present disclosure is not limited to the relative sizes and/or distances illustrated in the accompanying drawings.

Figure 1:
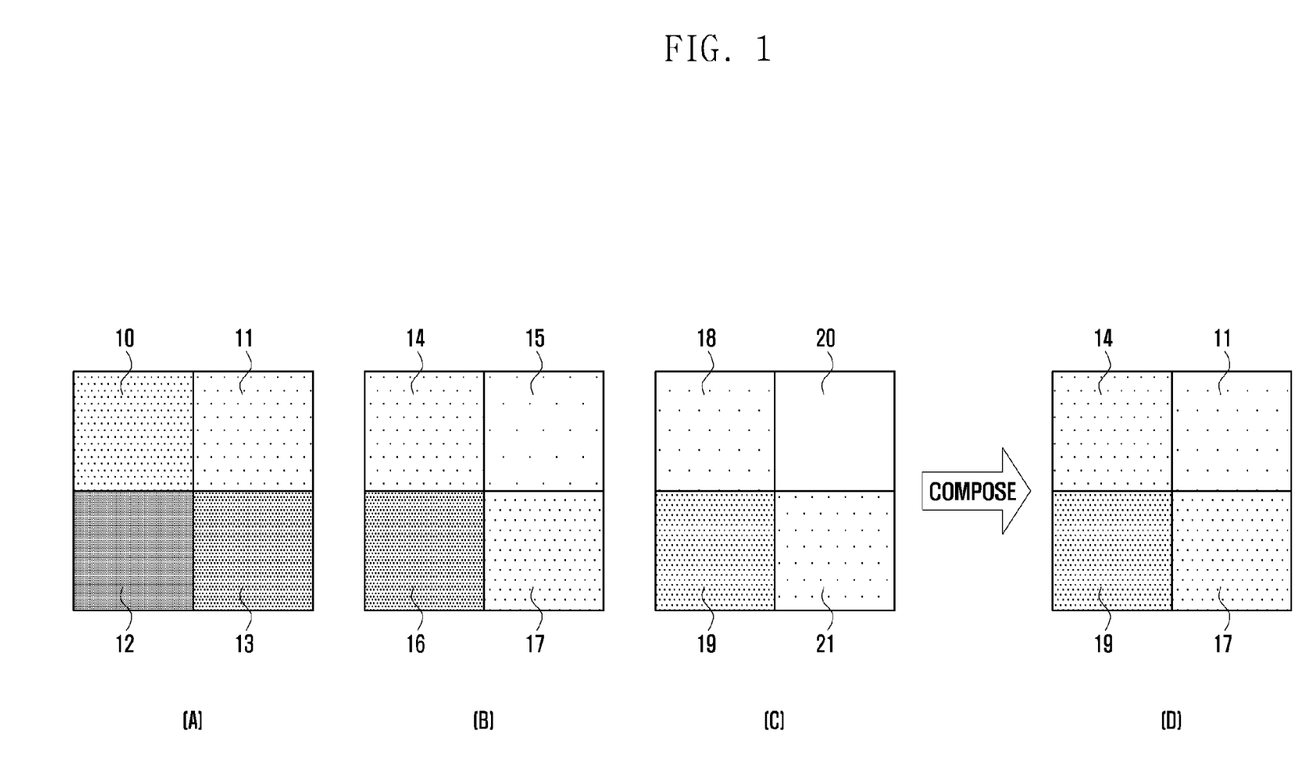
FIG. 1 is a schematic diagram illustrating an example of a technique for generating High Dynamic Range (HDR) images, in accordance with aspects of the disclosure.

FIG. 1 is a schematic diagram illustrating an example of a technique for generating High Dynamic Range (HDR) images, in accordance with aspects of the disclosure. In this example, images (A), (B), and (C) are images having different exposure values. The exposure values, for example, may be −2, 0, and +2.

Image (A) of FIG. 1, includes sections 10, 11, 12, and 13. In this example, section 12 includes a set (e.g., cluster) of pixels that are oversaturated. Image (B) includes sections 14, 15, 16, and 17. In this example, section 16 includes a collection of pixels that are undersaturated and section 15 includes a set of pixels that are under-saturated. Image (C) of FIG. 1 includes sections 18, 19, 20, and 21. In this example, section 20 includes a set of pixels that are over-saturated.

Image (D) is a composite image generated based on images (A), (B), and (C). Image D includes sections 11, 14, 17, and 19. Image (D) may be generated by selecting image (B) as a base image and replacing section 15 in the base image with section 11 from image (A) while also replacing section 16 in the base image with section 19 from image (C).

Figure 2:
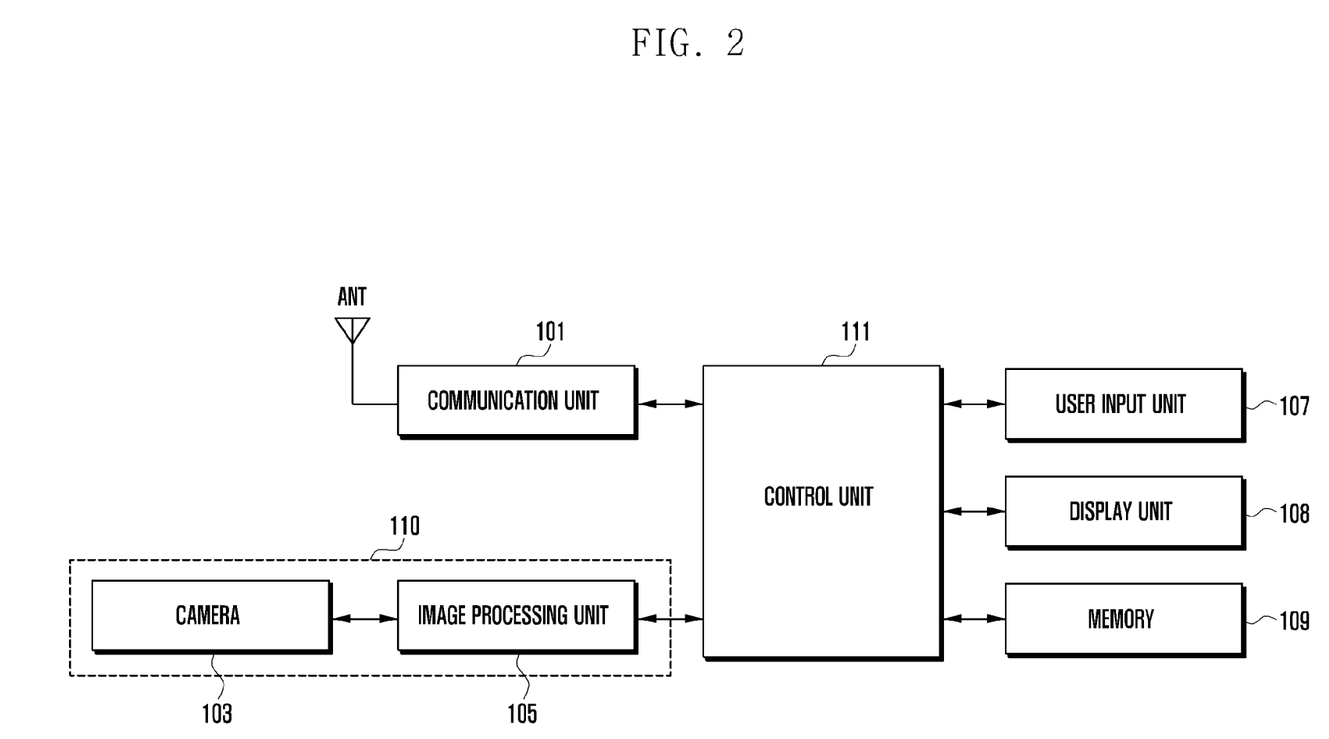
FIG. 2 is a block diagram illustrating an example of a configuration of an electronic device having a digital camera according to aspects of the disclosure.

FIG. 2 is a block diagram illustrating an example of a configuration of an electronic device having a digital camera according to aspects of the disclosure.

The communication unit 101 of the smart terminal may include an antenna ANT, and further include a wireless processing module, modem, microphone, and speaker even though not shown in the drawing. The antenna ANT may be configured with one or more antennas. If the antenna is configured with more than one antenna, an antenna for communicating with a mobile communication network and an antenna for communicating with another network such as Bluetooth and WiFi can be included.

The wireless processing module processes a wireless signal to communicate with a specific wireless network such as a mobile communication network, and up-converts the frequency of a voice or data signal to be transmitted corresponding to a frequency band used in the network, and down-converts the frequency of a signal received from the network. Namely, the wireless processing module up-converts the signal of data to the frequency of the corresponding network and transmits through the antenna ANT and down-converts a wireless signal received through the antenna ANT to a baseband signal.

The modem performs a series of data processing such as modulating, demodulating, encoding, and decoding of transmitting/receiving signals. If the smart terminal shown in FIG. 1 is a smart phone, the modem may include a vocoder for modulating/demodulating and encoding/decoding a voice signal. Further, the modem converts an electric voice signal received from a microphone to a digital voice signal, and output a digital voice signal through a speaker by converting to an electric voice signal. The modem processes a series of operations for the data such as modulating, demodulating, encoding, and decoding under the control of the control unit 111.

The camera module 110 of the smart terminal includes a camera 103 and an image processing unit 105. The camera 103 may include a lens, motor for driving the lens, control circuit for controlling the drive of the motor, and image sensor for receiving lights through a lens and obtaining electric signals for brightness and color information of the lights. The signal obtained by the sensor is a weak signal, and thereby an additional circuit for amplifying the obtained signal and converting to a digital signal may be included in the camera 103.

The image processing unit 105 converts a digital signal received from the camera 103 to graphic data which can be processed by the control unit 111, and transmits it to the control unit 111. Further, the image processing unit 105 processes additional information of image photographed by the camera 103 in an EXIF format in order to provide for the control unit 111. The additional information transmitted from the image processing unit 105 to control unit 111 may be, for example, an aperture, brightness, color range, date, time, exposure mode, exposure time, height and width of a photo, horizontal and vertical resolutions, and camera model. Further, the additional information may not be provided by the image processing unit 105 but obtained by the control unit 111 in advance. Namely, setting value for photographing can be predetermined.

The camera module 110 can have 2 different modules. In the case of a smart terminal, the camera modules can be installed at the front and rear sides of the smart terminal. In case of smart terminal having 2 cameras at the front and rear sides, only one camera module can be used. In this case, one image processing unit 105 is shared by the 2 cameras 103.

The user input unit 107 may be configured with a touch sensor for detecting a user input and key buttons for key inputs. The user input unit 107 receives a user's touch input signal and/or key input signal and transmits them to the control unit 111.

The display unit 108 may be configured with an LCD panel or an LED panel and displays a procedure of operating the smart terminal and a waiting state of the smart terminal under the control of the control unit 111.

The memory 109 is storage media such as a ROM and/or RAM and stores various control data required for the operation of smart terminal and user data. Further, the memory 109 may include an area for storing data directly received from the image processing unit 105. Such an area may be configured with a register or a buffer.

The control unit 11 may include any suitable type of processing circuitry, such as a processor (e.g., an ARM-based processor, a MIPS processor, an x86 processor), a Field-Programmable Gate Array (FPGA), or an Application-Specific Integrated Circuit (ASIC).

Figure 3:
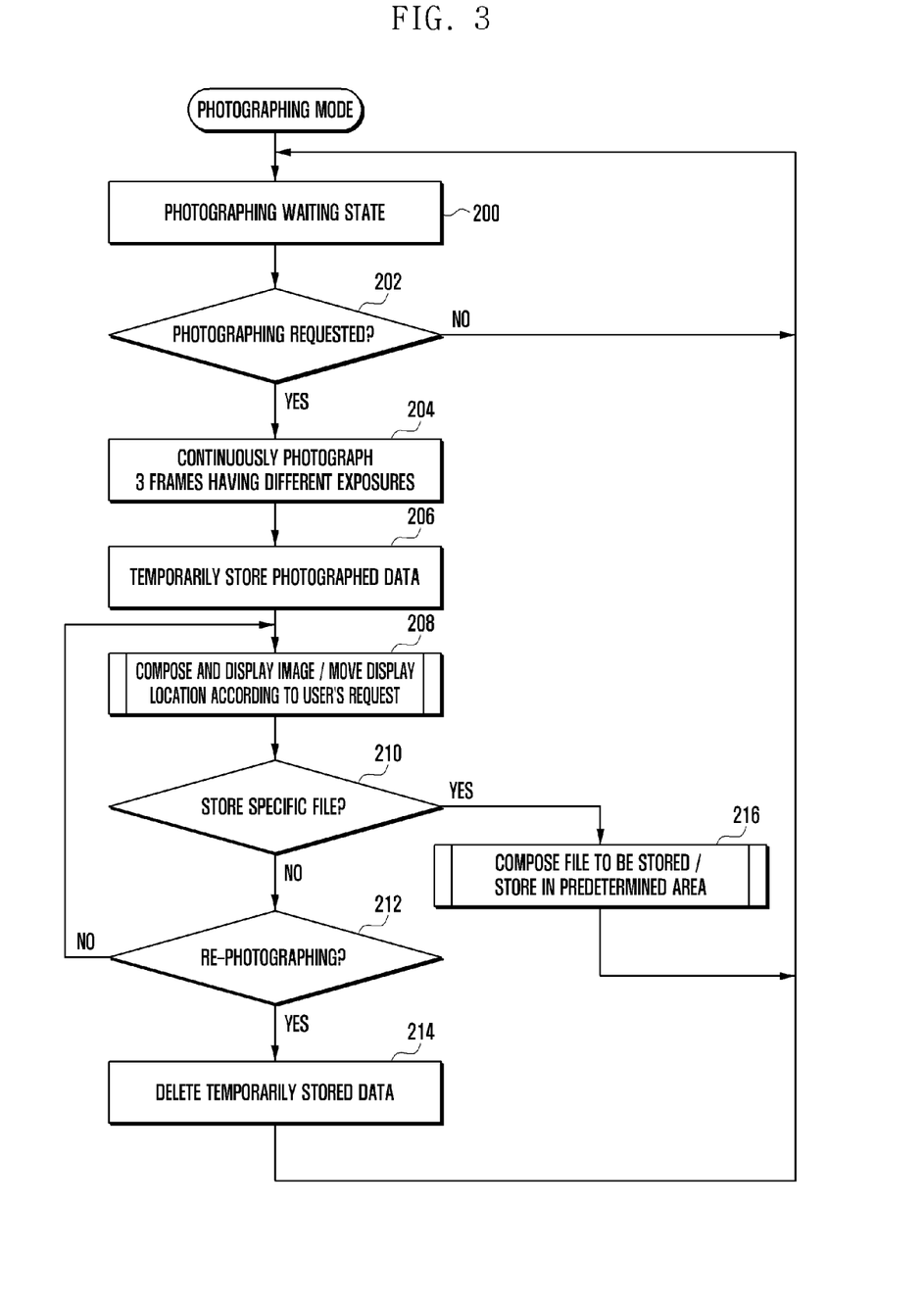
FIG. 3 is a flowchart of an example of a process for capturing HDR images, in accordance with aspects of the disclosure.

FIG. 3 is a flowchart of an example of a process for capturing HDR images, in accordance with aspects of the disclosure. At step 200, the control unit 111 maintains a waiting state. At step 202, the control unit 111 detects whether a request for photographing is received. The request for photographing may include a key input submitted via the user input unit 107. If the request is received, the process proceeds to step 204.

At step 204, the control unit 111 causes the camera module 110 to capture a plurality of images that differ from one another in at least one camera setting. In this example, three images having different exposure value are subsequently captured by the camera 103. In this example, the camera is set to a different exposure value when each of the images is captured. The three images may have exposure values of −2, 0, and +2 as shown in FIG. 1. A default exposure value is 0, an exposure value of −2 provides a dark photo having $2^{-2}$ brightness comparing to the default value, and an exposure value of +2 provides a bright image having $2^2$ brightness comparing to the default exposure value. Although in this example, the exposure value setting of the camera is varied when the plurality of images is captured, in other examples other camera settings may be varied, such as color balance, focal length, and/or any other suitable type of camera setting.

In some aspects, the plurality of images may be captured in one of automatic mode and a manual mode of the camera. When in automatic mode, the camera may capture the plurality of images automatically in response to a single activation of the camera's shutter release button. By contrast, when in manual mode, each of the images in the plurality may be captured in response to the shutter release button. Operating the camera in manual mode, may permit the user to manually vary different camera settings, such as exposure value, color, contrast, brightness, and reaming setting values. And user can be adjusted compensation above the values except the exposure value, after composing an image.

At step 206, the plurality of images is temporarily stored. The storing may be performed by the image processing unit 105, by the control unit 111, and/or by any other suitable electronic device component. In some implementations, the images may be stored in YUV format. The YUV format includes information of brightness (Y), difference of blue component from the brightness (U), and difference of red component from the brightness (V). Additionally or alternatively, the images and exposure value may be compressed when they are stored.

At step 208, the control unit 111 generates a plurality of composite images based on the plurality of captured images. In some aspect, one of the composite image may be display on the display unit 108. And composite image may be change another composite image, when user selected one of a plurality of composite image thumbnails that are displayed on the display unit 108.

At step 210, the control unit 111 determines whether to store the generated composite image permanently. If a determination is made to store the generated composite image, step 216 and the composite image is encoded JPEG format image and stored. Otherwise, the process proceeds to step 212.

At step 212, the control unit 111 detects whether re-photographing is requested at step 212. If the re-photographing is requested at step 212, the control unit 111 proceeds to step 214 and deletes the plurality of captured images and/or the generated composite image from temporary storage. Otherwise, if the re-photographing is not requested at step 212, the process returns to step 208.

In the present disclosure, the composing is performed at step 208 or at step 216. At step 216, an image having full pixels or pixels to be stored is finally composed, and at step 208, the composing result can be displayed for the user in a short time by reducing the size of image.

Hereafter, such operations for obtaining whole images are reviewed. The present disclosure is assumes that three images having different exposure values are obtained. The three images are then combined respectively in accordance with three different combination algorithms.

In some aspects, any number of images may be initially acquired and any number of composite images may be generated by combining the initially-acquired images. For example, two images having different setting values such as an exposure value may be obtained and more than two composite images can be provided. Further, 3 images having different setting values may be obtained and more than three (for example, four or five) composite images can be provided by using different composition algorithms. Hereafter, a case of obtaining 3 images having different exposure values and obtaining 3 composite images is described for the convenience in descriptions.

In the manual mode of photographing an HDR image according to the present disclosure, 3 images are photographed with full pixels or pixels designated by a user and predetermined exposure values. If the camera 103 continuously takes images having different exposure values and outputs to the image processing unit 105 in a raw format, the image processing unit 105 processes each image and outputs to the control unit 111 in a YUV format.

Accordingly, the control unit 111 controls to temporarily store the images having different exposure values in the memory 109. Here, the time required for storing an HDR image by composing in a full pixel size may differ according to performances of the camera 103, image processing unit 105, and control unit 111, and 0.8 to 3 seconds are required to store an image having 8 to 16 megapixels.

Generally, the exposure values are set in large variations, because the exposure values cannot be changed after photographing. For example, photographing is performed by setting the exposure values to −2, 0, and +2 so that images have brightness respectively of ¼, 1, and 4 times. If the images are combined by reducing the size of image having full pixels to a display size or a size suitable to an image ratio, the time required for composing the image is remarkably reduced and the composing result can be fed back to a user in a short time.

Like this, if the image is combined by reducing to a display size, the user can instantly and conveniently see the composing result with a full-screen display or a screen display suitable for a photo ratio. For example, it takes 2 seconds to compose an image having 16 megapixels and 0.1 second to compose an image having 960×720 resolution.

After pressing a button by a user, it may take about 0.2 second until a resultant composite image is displayed due to the time required for recognizing the button and converting to an RGB format for displaying after composing.

In some aspects, when images are combined to generate a composite image, each of the images may be weighted. For example, if the weight of an image having an exposure value of −2 is increased, a photo expressing a bright area better can be obtained, and if the weight of an image having an exposure value +2 is increased, a photo expressing a dark area better can be obtained. In some aspects, a given composite image may be associated with a weight-ratio. The weight-ratio may be the ratio of the weights in a set that is used to weight individual images before those images are combined to generate the composite image. For example, if the composite image is generated by combining a first image, a second image, and a third image and has a weight-ratio of "$w_1:w_2:w_3$", that composite image is generated by first weighting the first image (or portion thereof) by the value $w_1$, weighting the second image (or portion thereof) by the value $w_2$, and weighting the third image (or portion thereof) by the value $w_3$, and then combining the weighted versions of the first image, the second image, and the third image. It should be noted that in instances in which a given weight in a weight-ratio (e.g., one of $w_1$, $w_2$, and $w_3$) is equal to 1, that weight's respective image may not weighted.

However, if the bright area and dark area are improved too much, the contrast of the whole photo can be decrease or become unnatural. For this, the degree of adjusting an HDR image may differ according to personal preference. The present disclosure provides a plurality of steps for processing an HDR image by adjusting the composing weight. In each step, not only the composing weight of image but also tone mapping, contrast, color, and detail can be adjusted. Here, the tone mapping adjusts brightness distribution of image by adjusting Y-value gain of YUV format in the step of processing the HDR image by converting from a 16 bit image to an 8 bit image.

After photographing and storing 3 HDR images having different exposure values, a review screen may be provided so that a user can select a step of processing an HDR image. The review screen is described in more detail referring to FIGS. 5 and 6.

Figure 5:
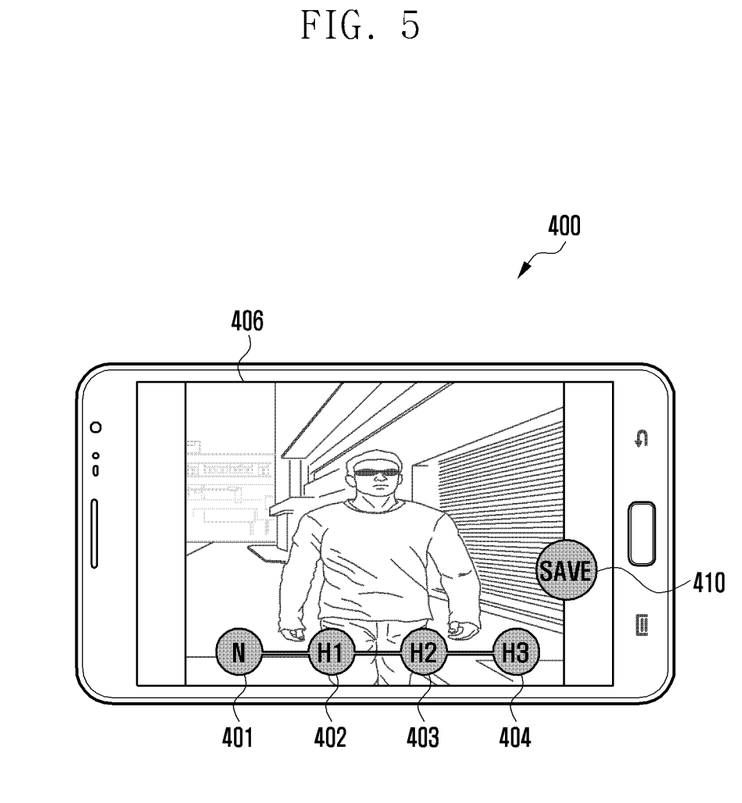
FIG. 5 is a diagram illustrating an example of a user interface for capturing HDR images in accordance with aspects of the disclosure.

FIG. 5 is a diagram illustrating an example of a user interface 400 for capturing HDR images in accordance with aspects of the disclosure. The user interface 400 includes a save button 410 and combination profile buttons 401, 402, 403, and 404. Each of the buttons 401, 402, 403, and 404 may be associated with a different combination profile. As used herein, the term "combination profile" may refer to a set of one or more algorithms (e.g., High-dynamic-range (HDR) imaging algorithms), weight values (e.g., a weight ratio), and/or other algorithm parameters which determine how a set of images is to be combined to generate a composite image camera 103. Although in this example buttons are used to select different combination profiles, in other examples any suitable type of input component can be used. In some aspects, combining images in accordance with an HDR imaging algorithm to generate a composite image may be referred to as "HDR-compositing."

In operation, when a user presses the shutter-release button of the, a plurality of images is captured, as discussed above with respect to FIGS. 1-3. Next, the user interface 400 is presented to the user on the display unit 108. Next, the user may activate one of the buttons 401, 402, 403, and 404. In response to the activation of the button, the plurality of images are combined in accordance with the button's combination profile to generate a composite image 406, which is then displayed on the display unit 108.

In some aspects, generating the composite image 406 may include scaling down the size of the images in the plurality before combining those images to generate the composite image 406. For example, the images may be reduced from size 4920×3264 pixels to 960×720 pixels. In some aspects, resizing the images in this manner can increase the speed at which the composite image previews are generated. For example, combining the images in the plurality without reducing them first could take up to 2 seconds, whereas combining the scaled-down versions of the images may take only 0.1 seconds.

If the user likes the preview composite image 406, the user may press the save button 410. When the save button 410 is pressed, a full resolution copy of the composite image 406 may be saved in permanent storage. In some aspects, the full resolution copy may be generated by combining full-resolution copies of the images in the plurality (e.g., the images that were originally captured, rather than the images that were scaled-down to generate the image previews).

Figure 6:
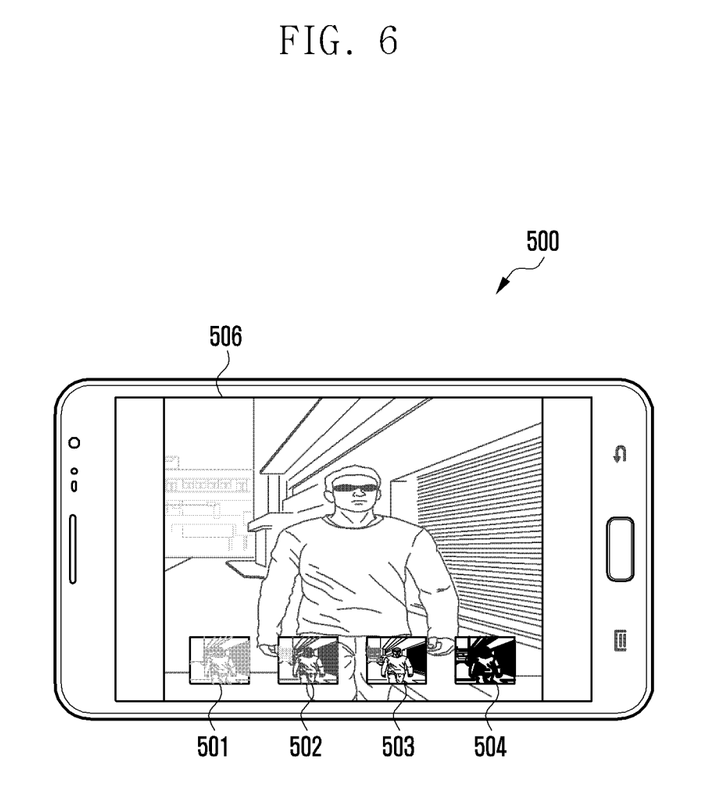
FIG. 6 is a diagram illustrating an example of a user interface for capturing HDR images in accordance with aspects of the disclosure.

FIG. 6 is a diagram illustrating an example of a user interface 500 for capturing HDR images in accordance with aspects of the disclosure. The user interface 600 includes thumbnails 501, 502, 503, and 504. Each of the thumbnails 501, 502, 503, and 504 may correspond to a different combination profile.

In operation, when a user presses the shutter-release button of the camera 103, a plurality of images is captured, as discussed above with respect to FIGS. 1-3 and 5. Next, the thumbnails 501, 502, 503, and 504 may be generated by combining the images in the plurality (or reduced-resolution versions thereof) in accordance with the thumbnails' respective combination profiles. By way of example, each of the thumbnails 501, 502, 503, 504 may be generated in accordance with a different weight-ratio. Next, the user may select one of the thumbnails 501, 502, 503, and 504. Next, in response to the thumbnail being selected, a preview composite image 506 may be displayed on the display unit 108. The preview composite image 506 may be an enlarged version of the selected thumbnail. Finally, the user may save a copy of the preview composite image 506 by pressing a save button (not shown). The saving may be performed in the manner discussed with respect to FIG. 5.

Figure 4:
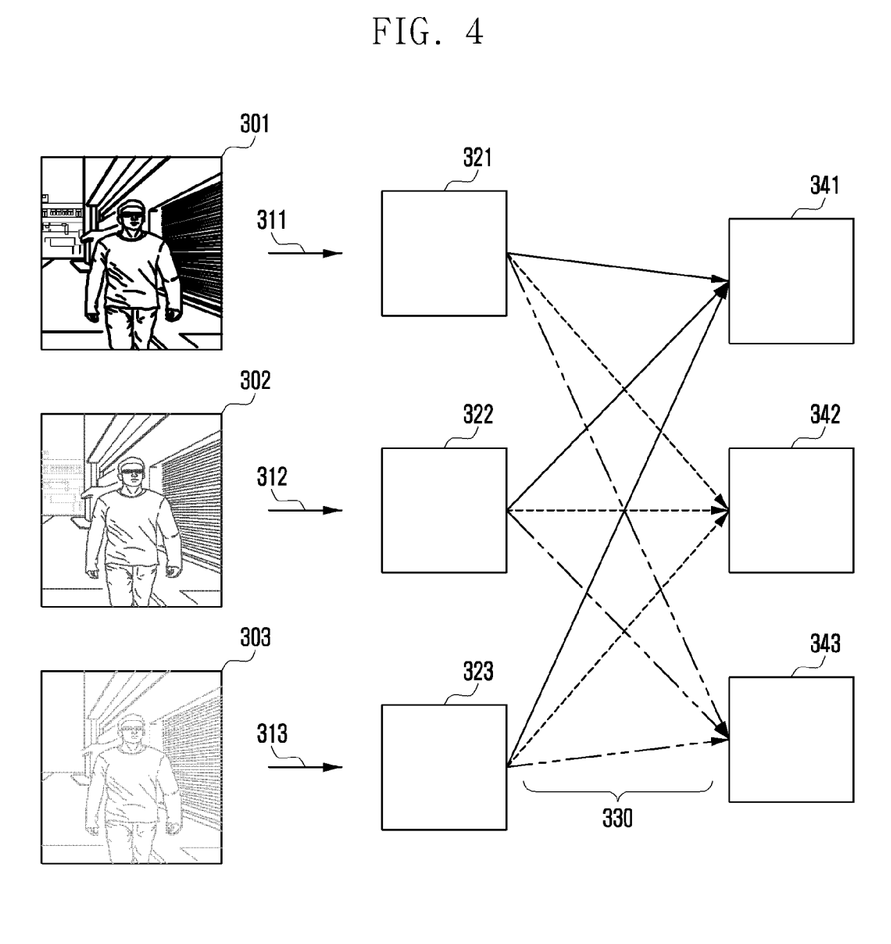
FIG. 4 is a diagram illustrating an example of a technique for capturing images, in accordance with aspects of the disclosure.

FIG. 4 is a diagram illustrating an example of a technique for capturing images, in accordance with aspects of the disclosure. In this example, images 301, 302, and 303 are captured. In this example, each of the images 301, 302, and 303 is captured using a different exposure value. In other examples, however, another camera setting may be varied across the set of images 301, 302, and 303, such as white balance and focal length.

Next, at operation 320, the images 301-303 are scaled down to generate images 321-323. Scaling down the images 301-303 may include lowering the images' resolution to a predetermined small value, such as, for example, 960×720 pixels. In some implementations, the images may be reduced down to the native resolution of the display unit 108.

Additionally or alternatively, in the steps 311, 312, and 313, the images 301-303 may be aligned with each other. If the images 301-303 are captured at different time instant, the location of the person in each of the images 301, 302, and 303 may be slightly different.

In some implementations, the alignment may be performed, at least in part, while some of the images 301, 302, and 303 are being captured in order to reduce the time it takes for the alignment to be performed. Additionally or alternatively, in some implementations, the alignment may be performed on the scaled-down images 321-323 in order to reduce the time it takes for the alignment to be performed. Although in this example, the alignment is performed to compensate for changes in the relative position of the person depicted in those images, in other examples, the alignment may be performed to compensate for camera shake and/or any other suitable type of disturbance.

The reduced images 321, 322, and 323 can be composed in a similar method to FIG. 1. Here, the composition of image is performed not only for one image according to the method of FIG. 1 but performed in a plurality of steps. Namely, by adjusting ratios of each area, images composed in a plurality of steps can be obtained. A plurality of composing methods can be preset according to a manufacturer's design image.

Next, at operation 321-323, the images are combined to generate composite images 341, 342, and 343. Each of the images 341, 342, and 343 may be generated by combining the images 341, 342, and 342. In some implementations, each of the images 341, 342, and 343 may be generated by using a different combination algorithm. Additionally or alternatively, each of the images may be combined by applying different weights to corresponding sections in the images 301 and 303. For example, a first set of weights may be respectively applied to the sections of each of the images 301, 302, and 303 that represent the person before combining those sections to generate the portion of the image 341 that represents the person. As another example, a second set of weights may be respectively applied to the sections of each of the images 301, 302, and 303 that represent the person before combining those sections to generate the portion of the image 341 that represents the person. The step of processing an HDR image selected in a manual mode can be performed in an automatic mode, and a user can adjust the step of processing an HDR image before photographing or apply the step of processing an HDR image selected in the manual mode in the automatic mode.

If the user adjusts the exposure value before HDR image photographing according to the present disclosure, the step of processing an HDR image can be adjusted.

As an alternative method, a predetermined step of processing an HDR image is not selected in the review screen, and a composing ratio, tone mapping, edge enhancement, color, contrast, brightness of the images having different exposure values can be directly adjusted by the user and the processed result can be directly shown in the view screen if a selected image to be stored is already aligned, an original image can be stored after composing according to a composing ratio. However, if the selected image to be stored is not aligned and only the image reduced to a thumbnail size is aligned, the original image must be re-aligned. Subsequently, the original image can be composed and stored by a composing method selected from a plurality of predetermined composing methods.

In a digital camera according to the present disclosure, if an image is obtained in a manual mode, a composing result can be shown rapidly with a reduced size, and an HDR image can be selected while looking at a photographing scene. Therefore, a digital camera according to the present disclosure enables the capturing of HDR image in a manual mode according to a user's preference.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

It should further be noted that the FIGS. 1-6 are provided as examples only. At least some of the operations discussed with respect to those figures can be performed in a different order, performed concurrently, or altogether omitted. Although aspects of the disclosure have been described in detail hereinabove, it should be understood that many variations and modifications of the basic inventive concept described herein will still fall within the spirit and scope of the disclosure as defined in the appended claims.

What is claimed is:

1. A method comprising:
    capturing a first set of images, wherein each one of the first set of images is captured in accordance with a different value of a camera setting;
    generating a second set of reduced images, wherein each of the second set of reduced images is a reduced version of a respective one of the first set of images;
    generating, by an electronic device, a third set of composite images, wherein each one of the third set of composite images is generated by HDR-compositing of the reduced images in the second set in accordance with a different weight-ratio;
    displaying at least two composite images in the third set;
    receiving an input selecting one of the displayed at least two composite images in the third set; and
    storing a composite image which is generated by HDR-compositing of the images in the first set in accordance with the weight ratio corresponding to the selected one of the composite images in the third set.

2. The method of claim 1, wherein the camera setting includes at least one of exposure value, white balance, and focal length.

3. The method of claim 1, wherein the composite images are generated by using at least one of a tone mapping algorithm and a color mapping algorithm.

4. The method of claim 1, further comprising, displaying a preview screen for displaying the composite images of third set with camera preview.

5. The method of claim 1, wherein the HDR-compositing includes aligning the images.

6. The method of claim 1, wherein each of the second set images has a same or lower resolution than a display unit of the electronic device.

7. The method of claim 1, wherein the weight ratio associated with the reduced image includes the weight ratio in accordance with which the reduced image is generated.

8. An apparatus comprising:
    a camera,
    an user interface,
    a memory, and
    a processor configured to:
        capture a first set of images, wherein each one of the first set of images is captured in accordance with a different value of a camera setting;
        generate a second set of reduced images, wherein each of the second set of reduced images is a reduced version of a respective one of the first set of images;
        generate, by an electronic device, a third set of composite images, wherein each one of the third set of composite images is generated by HDR-compositing of the reduced images in the second set in accordance with a different weight ratio;
        control a display to display at least two composite images in the third set;
        receive an input selecting one of the displayed at least two composite images in the third set, and
        store composite image which is generated by HDR-compositing of the images in the first set in accordance with the weight ratio corresponding to the selected one of the composite images in the third set.

9. The apparatus of claim 8, wherein the camera setting includes at least one of exposure value, white balance, and focal length.

10. The apparatus of claim 8, wherein the composite images are generated by using at least one of a tone mapping algorithm and a color mapping algorithm.

11. The apparatus of claim 8, further comprising, displaying a preview screen for displaying the composite images of third set with camera preview.

12. The apparatus of claim 8, wherein the HDR-compositing includes aligning the images.

13. The apparatus of claim 8, wherein each of the second set images has a same or lower resolution than a display unit of the electronic device.

14. The apparatus of claim 8, wherein the weight ratio associated with the reduced image includes the weight ratio in accordance with which the reduced image is generated.

* * * * *